A. A. PORTER, DEC'D.
B. A. BLACK, ADMINISTRATOR.
EXTENSION CAR STEP.
APPLICATION FILED JULY 26, 1911.

1,053,870.

Patented Feb. 18, 1913.

2 SHEETS—SHEET 1.

WITNESSES

INVENTOR
Asahel A. Porter
BY
ATTORNEYS

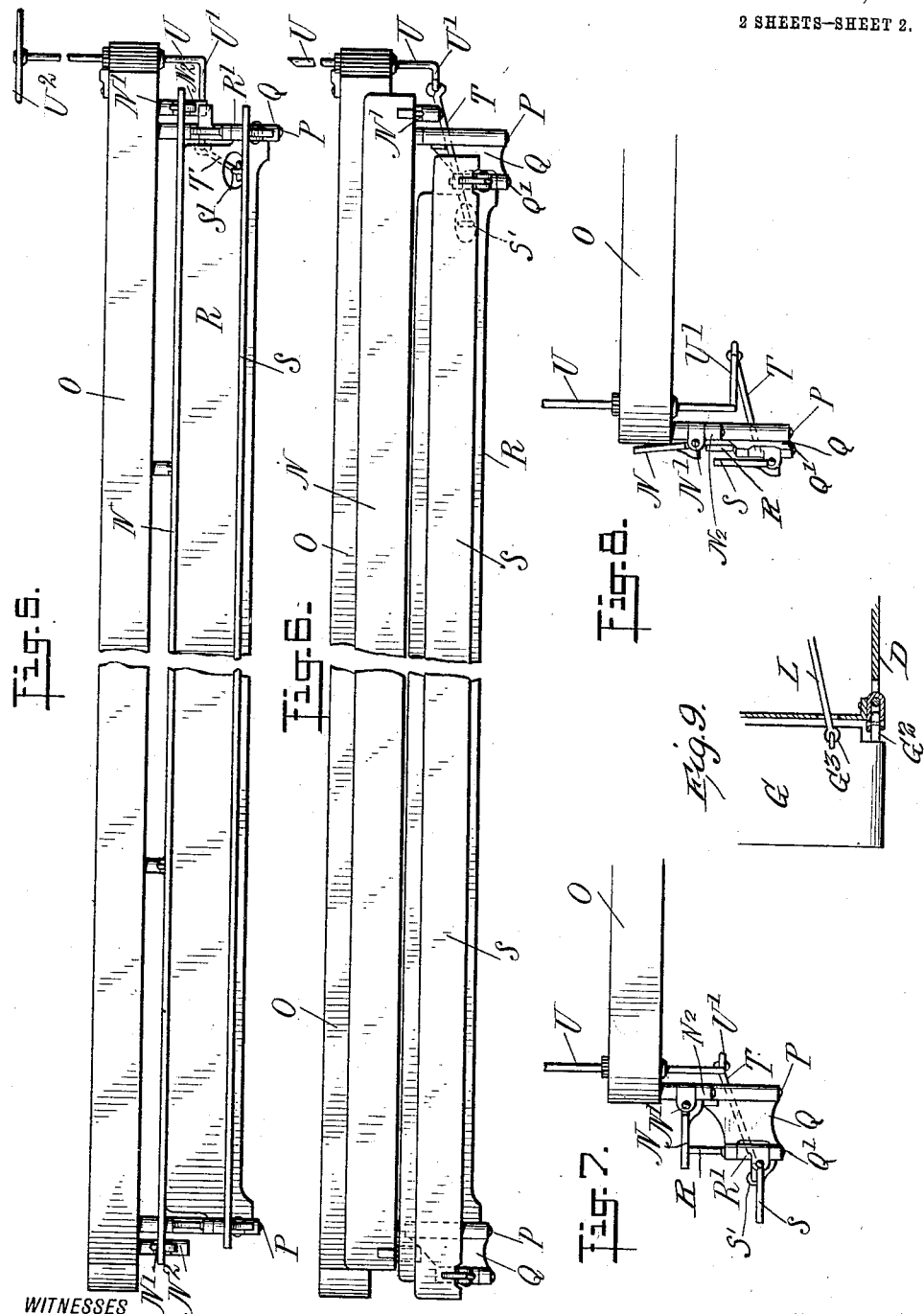

UNITED STATES PATENT OFFICE.

ASAHEL AGUSTAS PORTER, OF WATERBURY, CONNECTICUT; BURTON A. BLACK ADMINISTRATOR OF SAID PORTER, DECEASED.

EXTENSION CAR-STEP.

1,053,870.  Specification of Letters Patent.  Patented Feb. 18, 1913.

Application filed July 26, 1911. Serial No. 640,615.

*To all whom it may concern:*

Be it known that I, ASAHEL A. PORTER, a citizen of the United States, and a resident of Waterbury, in the county of New Haven and State of Connecticut, have invented a new and Improved Extension Car-Step, of which the following is a full, clear, and exact description.

The object of the invention is to provide a new and improved extension car step, for use on railroad cars and the like, and arranged to permit of swinging an extra or extension step in position below the lowermost step of the ordinary fixed car steps to enable persons to conveniently step on or step off the car, the extra or extension step when not in use being folded out of the way so as to form no obstruction while the car is in motion.

For the purpose mentioned use is made of brackets mounted to swing horizontally underneath the regular car step, a riser pivoted on the brackets, and an extension step pivoted on the riser and adapted to swing up or down.

A practical embodiment of the invention is represented in the accompanying drawings forming a part of this specification, in which similar characters of reference indicate corresponding parts in all the views.

Figure 1:
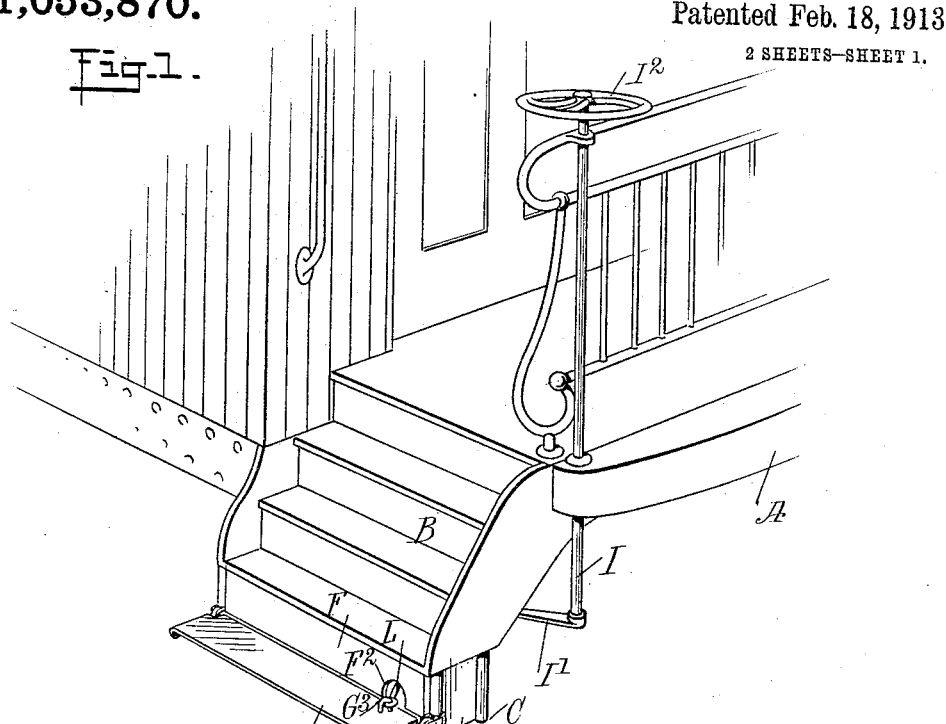
Figure 2:
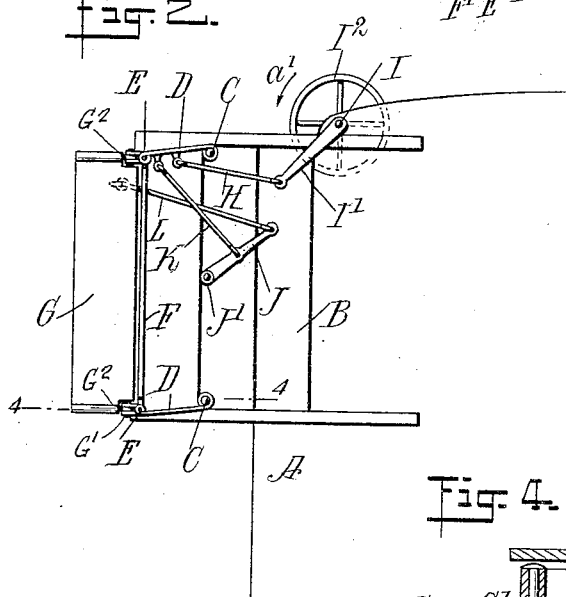
Figure 3:
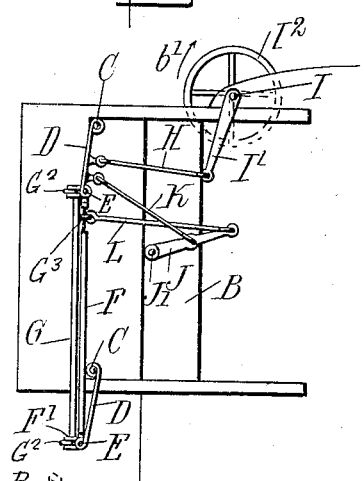
Figure 4:
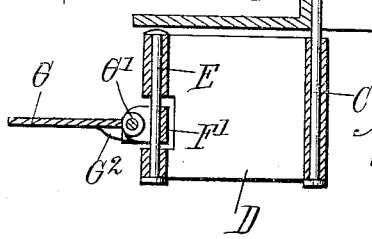

Figure 1 is a perspective view of the extension car step as applied to the steps on the end of a car platform; Fig. 2 is an inverted plan view of the same; Fig. 3 is a similar view of the same with the extension step in folded position; Fig. 4 is an enlarged transverse section of the same, on the line 4—4 of Fig. 2; Fig. 5 is a side elevation of the extension car step in position for use on the sides of an open or summer car; Fig. 6 is a like view of the same with the extension car steps folded; Fig. 7 is an end elevation of the same with the extension step in extended position; Fig. 8 is a like view of the same with the extension step folded, and Fig. 9 is a detail horizontal section showing one end of the step in extended position.

On the end of the car platform A, as illustrated in Figs. 1, 2 and 3, are arranged on each side the steps B, and from the under side of the steps B depend pivots C, on which are mounted to swing horizontally brackets D provided at their free ends with pivots E engaged by bearings F' formed by reduced end portions of a riser F extending below the lowermost of the steps B and acting in conjunction with the extension step G to form an extension car step for the steps B. The extension step G is mounted to swing up and down on pivots G' on the bearings F' of the riser F, and the extension step G in its lowered position is supported in horizontal position by lugs $G^2$ attached to the under side of the step G and abutting against the bearings F' (see Fig. 4). One of the brackets D is pivotally connected by a link H with an arm I' secured to the lower end of a vertically-disposed shaft I journaled in suitable bearings arranged on the platform A. On the upper end of the shaft I is secured a handle $I^2$, preferably in the form of a wheel or the like, to permit the person in charge of the car to turn the shaft I with a view to impart a horizontally swinging motion to the brackets D to move the riser F of the car step G into folded or extended position.

In order to impart an up-and-down swinging motion to the extension step G, use is made of a lever J fulcrumed at J' to the under side of the car steps B, and the said lever J is pivotally connected by a link K with one of the brackets D and by a link L with an eye $G^3$ held on the top of the extension step G. The link L passes through a cut-out portion $F^2$ formed in the riser F, as plainly indicated in Fig. 1. Now when a horizontally swinging motion is given to the bracket D on turning the shaft I as above explained, then a swinging motion is given to the lever J by the link K, and the swinging motion of the lever J causes an up-and-down swinging of step, the step G owing to the link L connecting the lever J with the step G. Thus when the operator turns the shaft I in the direction of the arrow a' (see Fig. 2), then the brackets D are swung horizontally in an inward direction, and at the same time an upward swinging motion is given to the step G so that the riser F as well as the step G are moved completely under the lowermost of the steps B with the extension step G in vertical position, as will be readily understood by reference to Fig. 3. When it is desired to make use of the extension step G then the operator turns the shaft I by the hand wheel $I^2$ in the direction of the arrow b' (see Fig. 3), whereby an outward swinging motion is given to the brackets D to move the riser F and the step G into a forward position, and at the same time swing the extension step G downward into a horizontal position, as shown in Figs. 1 and 2.

In the modified form shown in Figs. 5, 6, 7 and 8, the running board or step N on each side of the car is pivoted at N' on posts N² depending from the car body O, and the said running board or step N is adapted to be swung upward or folded against the side of the car body O when not in use (see Figs. 6 and 8). Adjacent the posts N² are arranged pivots P secured to the car body O, and on the pivots P are mounted to swing horizontally brackets Q carrying at their free ends vertically-disposed pivots Q' engaged by bearings R' formed by the reduced ends of the riser R which riser in conjunction with the extension running board or step S forms an extension for the running board or main step N. The upper surface of the extension running board or step S is provided with an eye S' pivotally connected by a link T with an arm U' secured on the lower end of a shaft U journaled on the end of the car body O and carrying a handle U² under the control of the person in charge of the car.

When the extension step is not in use then the regular running board N is swung upward by hand, and the operator turns the shaft U so as to swing the extension running board S into a vertical position (see Figs. 6 and 8), after which the said folded running board S together with the riser R are moved horizontally to swing the same into a folded position, as plainly indicated in Figs. 6 and 8. It is understood that in this case the up-and-down movement of the extension running board S is only actuated on turning the shaft U, and the sidewise movement is accomplished by the operator while standing on the ground and either before or after the operator swings the regular running board or step N up into a folded position.

Having thus described my invention, I claim as new and desire to secure by Letters Patent:

1. An extension car step, comprising brackets mounted to swing horizontally on the car, a riser pivoted on the brackets to move therewith, and an extension step pivoted on the riser to move therewith and swing up and down.

2. An extension car step, comprising brackets pivoted on the car underneath the regular bottom car step to swing horizontally, vertical pivots carried by the free ends of the said brackets, a riser having bearings engaging the said bracket pivots, and an extension step pivoted on the said bracket bearings to swing up and down.

3. An extension car step, comprising brackets pivoted on the car underneath the regular bottom car step to swing horizontally, vertical pivots carried by the free ends of the said brackets, a riser having bearings engaging the said bracket pivots, an extension step pivoted on the said bracket bearings to swing up and down, and stop lugs on the said extension step and adapted to engage the said bearings to limit the downward swinging motion of the extension step.

4. An extension car step, comprising brackets mounted to swing horizontally on the car, a riser pivoted on the brackets, an extension step pivoted on the riser to swing up and down, and manually-controlled means connected with the said extension step to swing the same up and down.

5. An extension car step, comprising brackets mounted to swing horizontally on the car, a riser pivoted on the brackets, an extension step pivoted on the riser to swing up and down, and manually-controlled means connected with one of the said brackets and the said extension step to swing the brackets and riser horizontally and the extension step up or down.

6. An extension car step, comprising brackets pivoted on the car underneath the regular bottom car step to swing horizontally, vertical pivots on the free ends of the said brackets, a riser having bearings engaging the said bracket pivots, an extension step pivoted on the said bracket bearings to swing up and down, a manually-controlled shaft disposed vertically and provided at its lower end with an arm, a link connecting the said arm with one of the said brackets, a lever, and links connected with the said lever, one of the links connecting with the said bracket and the other with the said extension step.

In testimony whereof I have signed my name to this specification in the presence of two subscribing witnesses.

ASAHEL AGUSTAS PORTER.

Witnesses:
A. T. BARLOW,
GEO. N. MARSHALL.

---

Copies of this patent may be obtained for five cents each, by addressing the "Commissioner of Patents, Washington, D. C."